United States Patent
Black (10) Patent No.: US 6,829,836 B1
(45) Date of Patent: Dec. 14, 2004

(54) MATERIAL DISPENSING APPARATUS WITH LINE LEVEL

(75) Inventor: Charles D. Black, Williston, ND (US)

(73) Assignee: New Products Marketing Corporation, Williston, MD (US)

( * ) Notice: Subject to any disclaimer, the term of this patent is extended or adjusted under 35 U.S.C. 154(b) by 0 days.

(21) Appl. No.: 10/447,484

(22) Filed: May 28, 2003

Related U.S. Application Data (63) Continuation-in-part of application No. 10/100,305, filed on Mar. 15, 2002, now Pat. No. 6,581,295.

(51) Int. Cl.$^7$ ................................................. G01C 9/26
(52) U.S. Cl. .......................... 33/369; 33/413; 33/1 LE
(58) Field of Search ........................ 33/369–371, 573, 33/761, 768, 769, 339, 347, 374–376, 383, 384; 269/47, 48, 50

(56) References Cited

U.S. PATENT DOCUMENTS

| | | | | |
|---|---|---|---|---|
| 691,631 A | * | 1/1902 | Jackson | 33/369 |
| 839,751 A | | 5/1906 | Grunewald | |
| 1,176,439 A | * | 3/1916 | Falls | 33/369 |
| 1,369,652 A | | 2/1921 | Hall | |
| 1,489,572 A | | 4/1924 | Bennewitz | |
| 2,708,317 A | | 5/1955 | Warne | 33/207 |
| 3,225,451 A | | 12/1965 | Olexson et al. | 33/207 |
| 3,593,428 A | | 7/1971 | Jacoff | 33/211 |
| 3,828,438 A | | 8/1974 | Raymond, Jr. | 33/137 |
| 3,878,617 A | | 4/1975 | West et al. | 33/369 |
| 4,068,386 A | | 1/1978 | Streeter | 33/369 |
| 4,189,844 A | | 2/1980 | Riggins, Sr. | 33/414 |
| 4,228,588 A | | 10/1980 | Horton, Jr. | 33/1 |
| 4,274,203 A | | 6/1981 | Vasile | 33/1 |
| 4,462,167 A | | 7/1984 | Huat | 33/339 |
| 5,165,650 A | | 11/1992 | Letizia | 248/467 |
| 5,482,095 A | | 1/1996 | de Chollet | 141/380 |
| 5,659,967 A | | 8/1997 | Dufour | 33/369 |
| 5,664,739 A | | 9/1997 | Black et al. | 242/588.2 |
| 5,778,544 A | | 7/1998 | Pherigo | 33/335 |
| 5,927,635 A | | 7/1999 | Black et al. | 242/395 |
| 6,138,369 A | | 10/2000 | Mushin | 33/379 |
| 6,148,529 A | | 11/2000 | Kennedy | 33/374 |
| 6,209,219 B1 | | 4/2001 | Wakefield et al. | 33/761 |
| 6,581,295 B1 | * | 6/2003 | Black | 33/369 |
| 6,640,456 B2 | * | 11/2003 | Owoc et al. | 33/382 |
| 2002/0069543 A1 | * | 6/2002 | Owoc et al. | 33/382 |

* cited by examiner

Primary Examiner—G. Bradley Bennett (57) ABSTRACT

A material dispensing apparatus with line level for conveniently storing and providing access to a line level within a material dispenser. The material dispensing apparatus with line level includes a shoulder having a receiver cavity, a first catch member and a second catch member attached to the shoulder within the receiver cavity, and a line level having a first nub and a second nub at opposing ends thereof. The nubs are catchably received within the catch members when the line level is positioned within the receiver cavity. An alternative embodiment utilizes the hooks of the line level to engage members extending inwardly from the receiver cavity.

9 Claims, 8 Drawing Sheets

MATERIAL DISPENSING APPARATUS WITH LINE LEVEL

CROSS REFERENCE TO RELATED APPLICATIONS

I hereby claim benefit under Title 35, United States Code, Section 120 of U.S. patent application Ser. No. 10/100,305 filed March 15, 2002, now U.S. Pat. No. 6,581,295. This application is a continuation-in-part of the Ser. No. 10/100, 305 application. The Ser No. 10/100,305 application is currently pending. The Ser. No. 10/100,305 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to material dispensers and more specifically it relates to a material dispensing apparatus with line level for conveniently storing and providing access to a line level within a material dispenser.

2. Description of Related Art

Line levels and elongate material dispensers have been in use for years. Construction workers, including carpenters, masonry workers, steel workers, and the like frequently use elongate lengths of heavy string, often referred to as "construction line", pulled taut between various points in order to establish straight lines. Straight lines are often necessary to aide in taking measurements or to properly align structural elements during construction. The workers often times utilize a line level that removably attaches to the taut construction line to ensure the levelness of the construction line.

Conventional elongate material dispensers commonly have a handle structure with a structure for rotatably receiving a spool of elongate material such as but not limited to string, cord or rope. Elongate material dispensers are manufactured in various styles that are all capable of dispensing elongate material. Examples of elongate material dispensers are disclosed in U.S. Pat. No. 5,664,739 to Black et al. and U.S. Pat. No. 5,927,635 to Black et al.

Figure 3:
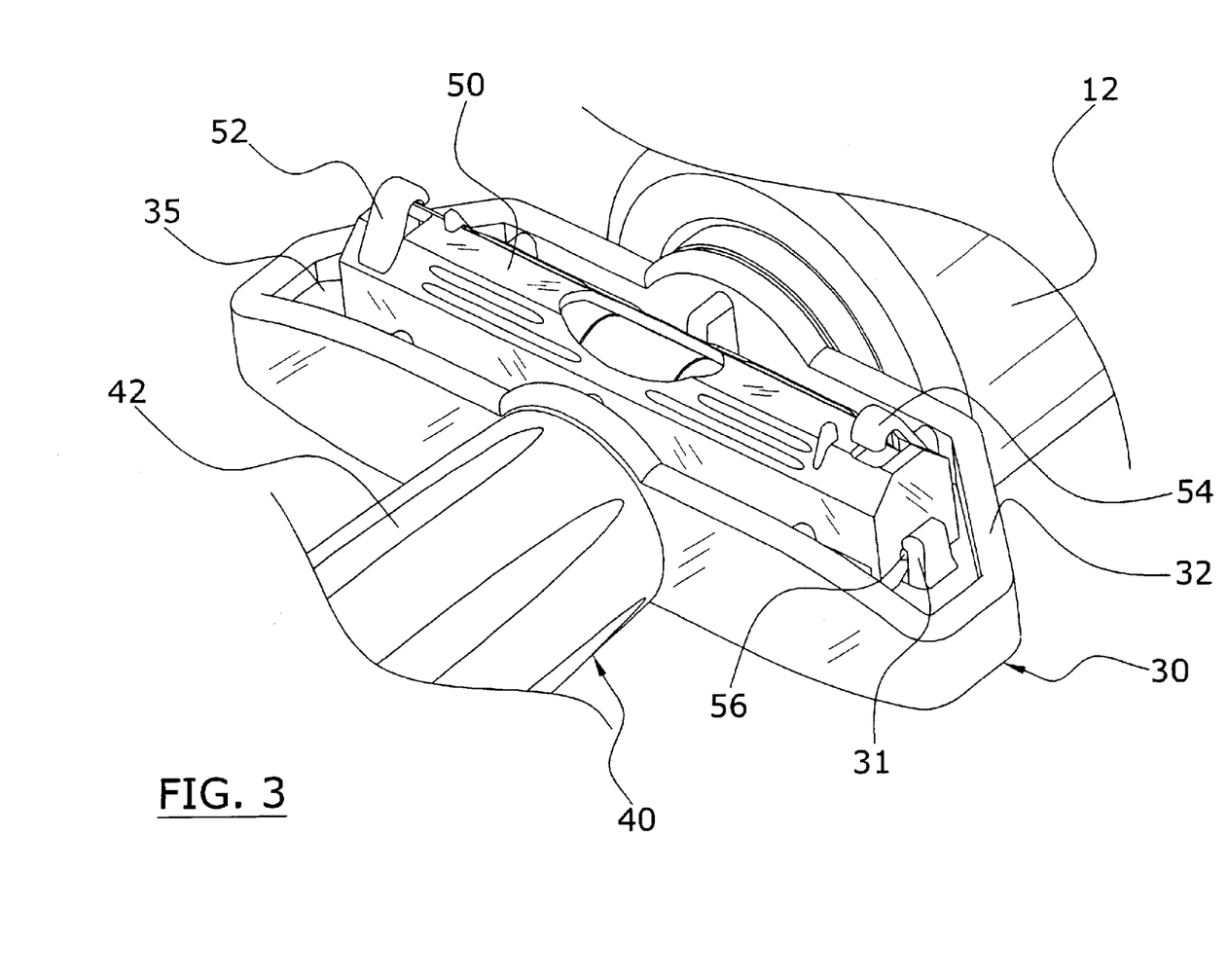
FIG. 3 is a magnified upper perspective view of the present invention.

Line levels have also been in use for years and are utilized to determine whether a string placed in tension is level. Line levels have two opposing hook members that are typically reversed to provide a positive catch upon the string as best illustrated in FIG. 3 of the drawings. U.S. Pat. No. 5,659,967 to Dufour and U.S. Pat. No. 4,068,386 to Streeter illustrate line levels suitable for usage with the present invention.

The main problem with conventional material dispensers and line levels is that there is no convenient location to store and provide access to the line levels during non-usage of the line level. A further problem with the prior art is that line levels are often times misplaced, lost, broken or damaged since there is no convenient storage location. Another problem is that it can be time consuming for workers on a construction site to locate a line level which may be in a completely separate location from the elongate material dispenser.

Examples of patented devices which are related to the present invention include U.S. Pat. No. 4,189,844 to Riggins, Sr.; U.S. Pat. No. 4,228,588 to Horton, Jr.; U.S. Pat. No. 6,148,529 to Kennedy; U.S. Pat. No. 6,209,219 to Wakefield et al. U.S. Pat. No. 4,462,167 to Huat; U.S. Pat. No. 4,274,203 to Vasile; and U.S. Pat. No. 5,482,095 to de Chollet.

While these devices may be suitable for the particular purpose to which they address, they are not as suitable for conveniently storing and providing access to a line level within a material dispenser. Conventional elongate material dispensers do not provide a convenient location to store and provide access to a line level during non-usage of the line level.

In these respects, the material dispensing apparatus with line level according to the present invention substantially departs from the conventional concepts and designs of the prior art, and in so doing provides an apparatus primarily developed for the purpose of conveniently storing and providing access to a line level within a material dispenser.

BRIEF SUMMARY OF THE INVENTION

In view of the foregoing disadvantages inherent in the known types of material dispensers now present in the prior art, the present invention provides a new material dispensing apparatus with line level construction wherein the same can be utilized for conveniently storing and providing access to a line level within a material dispenser.

The general purpose of the present invention, which will be described subsequently in greater detail, is to provide a new material dispensing apparatus with line level that has many of the advantages of the material dispensers mentioned heretofore and many novel features that result in a new material dispensing apparatus with line level which is not anticipated, rendered obvious, suggested, or even implied by any of the prior art material dispensers, either alone or in any combination thereof.

To attain this, the present invention generally comprises a shoulder having a receiver cavity, a first catch member and a second catch member attached to the shoulder within the receiver cavity, and a line level having a first nub and a second nub at opposing ends thereof. The nubs are catchably received within the catch members when the line level is positioned within the receiver cavity. An alternative embodiment utilizes the hooks of the line level to engage members extending inwardly from the receiver cavity.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a material dispensing apparatus with line level that will overcome the shortcomings of the prior art devices.

A second object is to provide a material dispensing apparatus with line level for conveniently storing and providing access to a line level within a material dispenser.

Another object is to provide a material dispensing apparatus with line level that provides convenient access to a line level at all times during the usage of an elongate material dispenser.

An additional object is to provide a material dispensing apparatus with line level that reduces the likelihood of accidentally losing, damaging, misplacing or destroying a line level.

A further object is to provide a material dispensing apparatus with line level that reduces employee time on construction projects.

Another object is to provide a material dispensing apparatus with line level that is capable of being utilized with various types of line levels.

A further object is to provide a material dispensing apparatus with line level that may be utilized within various styles of elongate material dispensers.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview of Main Embodiment

Turning now descriptively to the drawings, in which similar reference characters denote similar elements throughout the several views, FIGS. 1 through 8 illustrate a material dispensing apparatus with line level 10, which comprises a shoulder 20 (or 30) having a receiver cavity 35, a first catch member 31 and a second catch member 33 attached to the shoulder 20 (or 30) within the receiver cavity 35, and a line level 50 having a first nub 56 and a second nub 58 at opposing ends thereof. The nubs 56, 58 are catchably received within the catch members 31, 33 when the line level 50 is positioned within the receiver cavity 35.

B. Line Level

Figure 6:
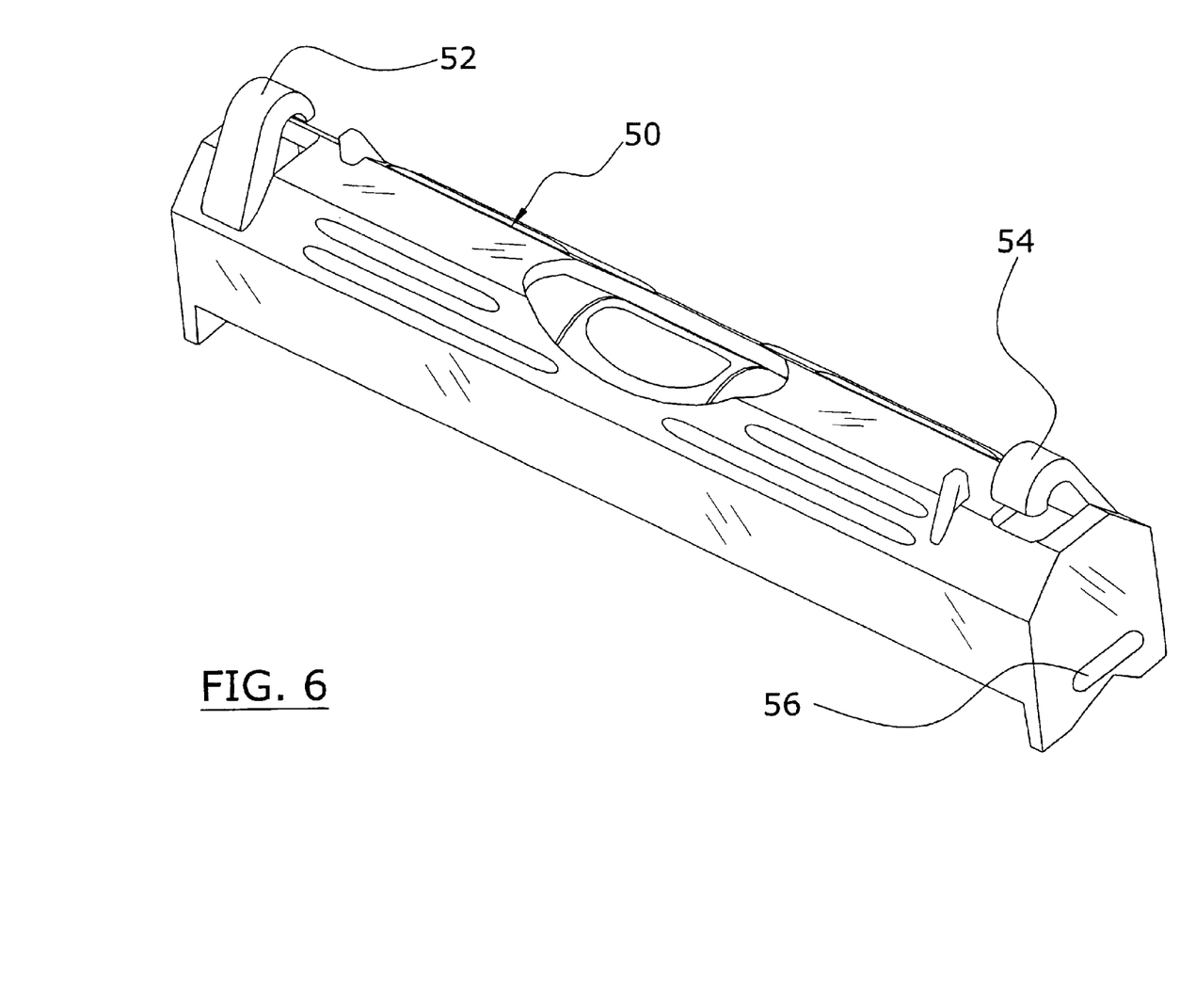
FIG. 6 is an upper perspective view of the line level.

As shown in FIG. 6 of the drawings, the line level 50 is basically comprised of a housing structure containing a liquid level indicator within, a first hook 52 attached to a first end of the housing structure and a second hook 54 attached to the opposing end of the housing structure.

U.S. Pat. No. 5,659,967 to Dufour and U.S. Pat. No. 4,068,386 to Streeter illustrate line levels 50 suitable for usage with the present invention and are hereby incorporated by reference for the purpose of disclosing the structure and functionality of the line level 50. The line level 50 may have various other structures and sizes which are well known in the art of line levels 50.

The opposing ends of the line level 50 preferably have a first nub 56 and a second nub 58 as shown in FIGS. 4a through 6 of the drawings. The first nub 56 and the second nub 58 are catchably received by the catch members 31, 33 as best shown in FIGS. 4b and 4c of the drawings. The first nub 56 and the second nub 58 preferably have a horizontally aligned straight structure as best shown in FIG. 6 of the drawings.

Various other structures and shapes may be utilized to construct the first nub 56 and the second nub 58. For example, an indention or opening into each of the opposing ends may serve a similar function as the nubs 56, 58 for catchably receiving the catch members.

C. Material Dispenser

Figure 1:
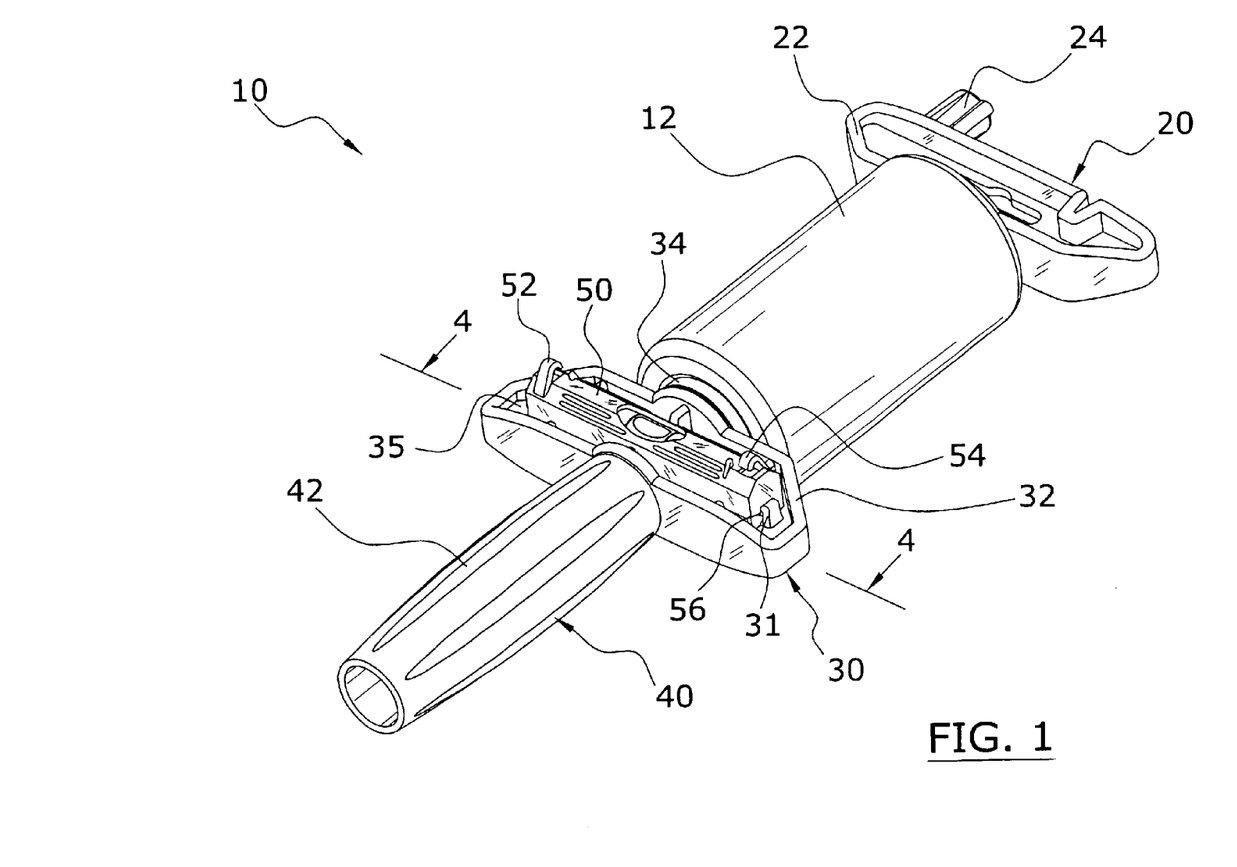
FIG. 1 is an upper perspective view of the present invention.
Figure 2:
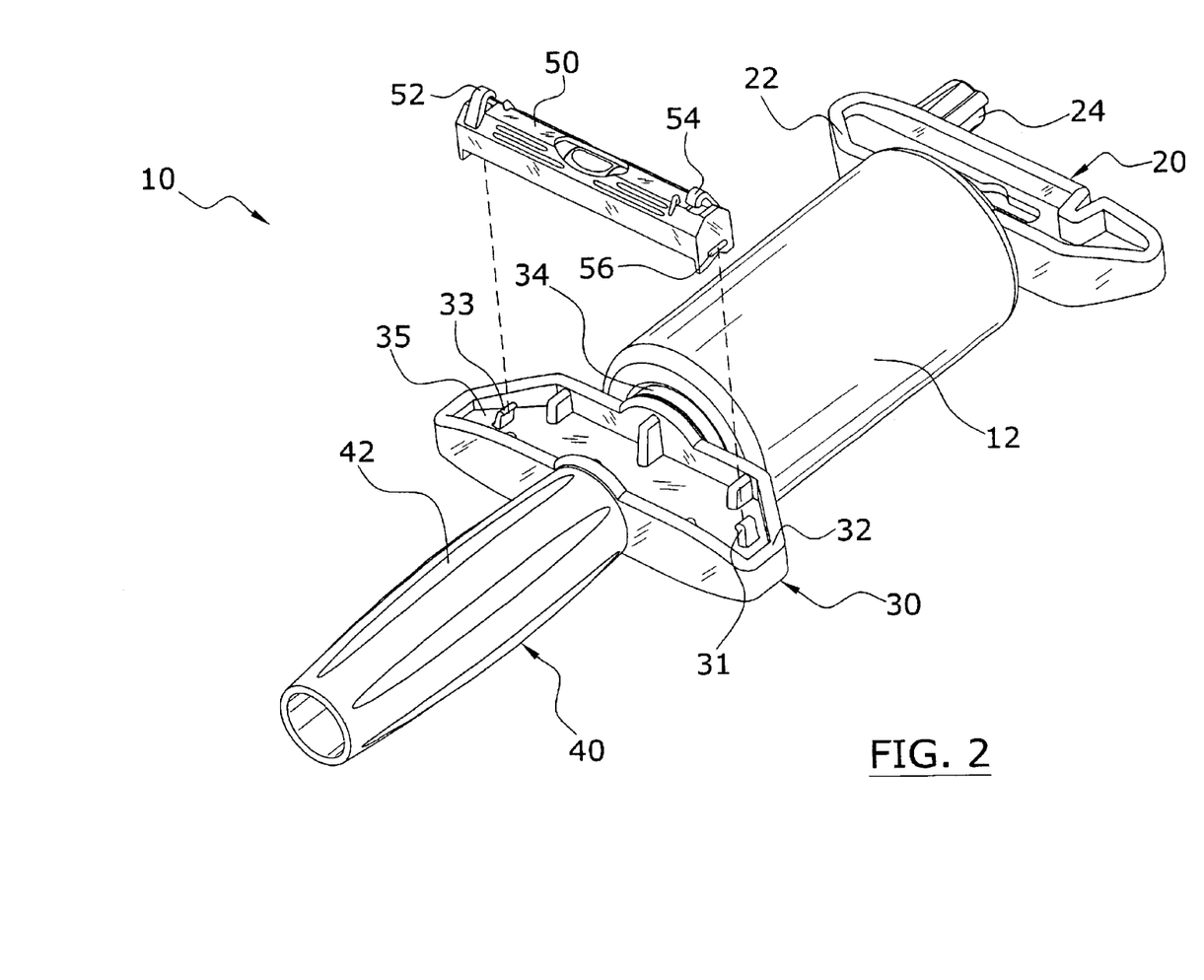
FIG. 2 is an exploded upper perspective view of the present invention.

As shown in FIGS. 1 and 2 of the drawings, the material dispenser for dispensing the construction line is preferably comprised of a handle structure 40 attached to a frame. The frame is preferably comprised of a second shoulder 30, a shank 34 extending from the second shoulder 30, and a first shoulder 20 attached to the distal end of the shank 34.

The frame may be comprised of various other structures not illustrated in the drawings capable of receiving a spool and/or elongate material. The first shoulder 20 preferably includes a first body 22 and a first handle 24 rotatably attached to the first body 22. The second shoulder 30 preferably includes a second body 32 connected to the shank 34.

A spool 12 of elongate material is attached about the shank 34 in a rotatable or non-rotatable manner. The handle structure 40 is preferably a rotatable structure to allow for the dispensing of the elongate material from the spool 12 in an easy manner, however the handle structure 40 may be non-rotatably attached to the shank 34.

The first shoulder 20 and the second shoulder 30 are preferably comprised of a structure broader than the shank 34 for retaining the spool 12 in the desired location. The spool 12 preferably contains an elongate material such as but not limited to construction line, string, cable and the like. It can be appreciated that various other types of structures may be utilized that do not utilize a spool 12 for retaining and dispensing the elongate material.

Examples of elongate material dispensers are disclosed in U.S. Pat. No. 5,664,739 to Black et al. and U.S. Pat. No. 5,927,635 to Black et al. which are hereby incorporated by reference for the purpose of disclosing the overall structure and functionality of the material dispenser. It can be appreciated that the material dispenser may be comprised of a various other structures not illustrated within the drawings, the '739 patent and the '635 patent. The present invention is suitable for usage with various other configurations and embodiments not illustrated within the drawings.

D. Receiver Structure

A receiver cavity 35 or similar receiving structure is positioned within either the first shoulder 20 or the second shoulder 30. FIGS. 1 through 3 of the drawings illustrate the receiver cavity 35 positioned within the second shoulder 30 only for illustration purposes and should not limit the invention.

The receiver cavity 35 has a size sufficient for receiving the entire length of the line level 50 as best illustrated in FIG. 3 of the drawings. Within the receiver cavity 35 a first catch member 31 and a second catch member 33 extend upwardly from the body (22 or 32) of the shoulder (20 or 30). The catch members 31, 33 each have a hooked end structure for catchably engaging and retaining the nubs 56, 58 as shown in FIGS. 4a through 5c of the drawings.

The catch members 31, 33 may have various other structures capable of selectively catching the nubs 56, 58 of the line level 50. Alternatively, the receiver cavity 35 may frictionally receive the line level 50 without the usage of the catch members 31, 33.

E. Alternative Embodiment

Figure 7:
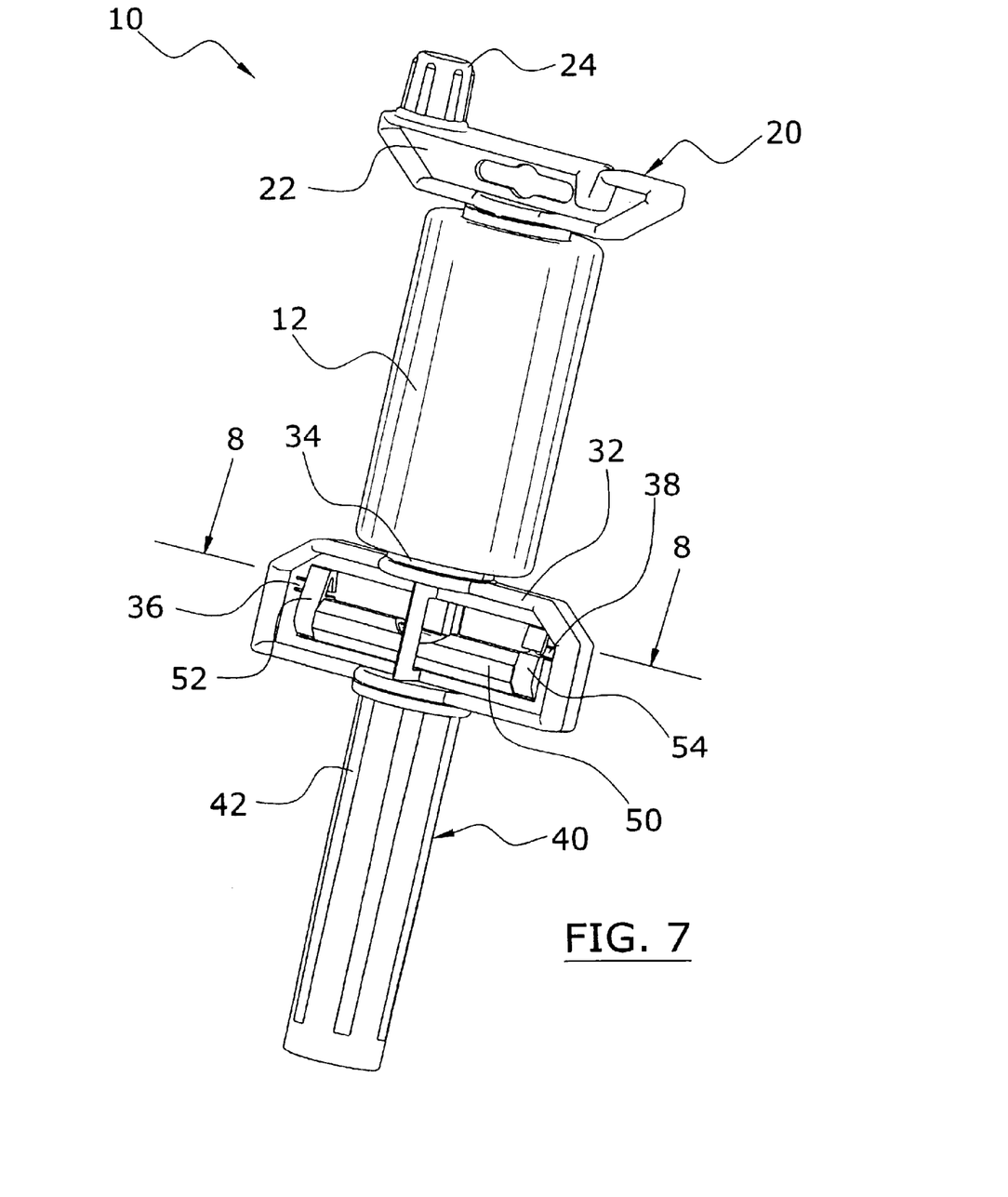
FIG. 7 is an upper perspective view of a fourth embodiment of the present invention with the line level in the second shoulder structure.
Figure 8:
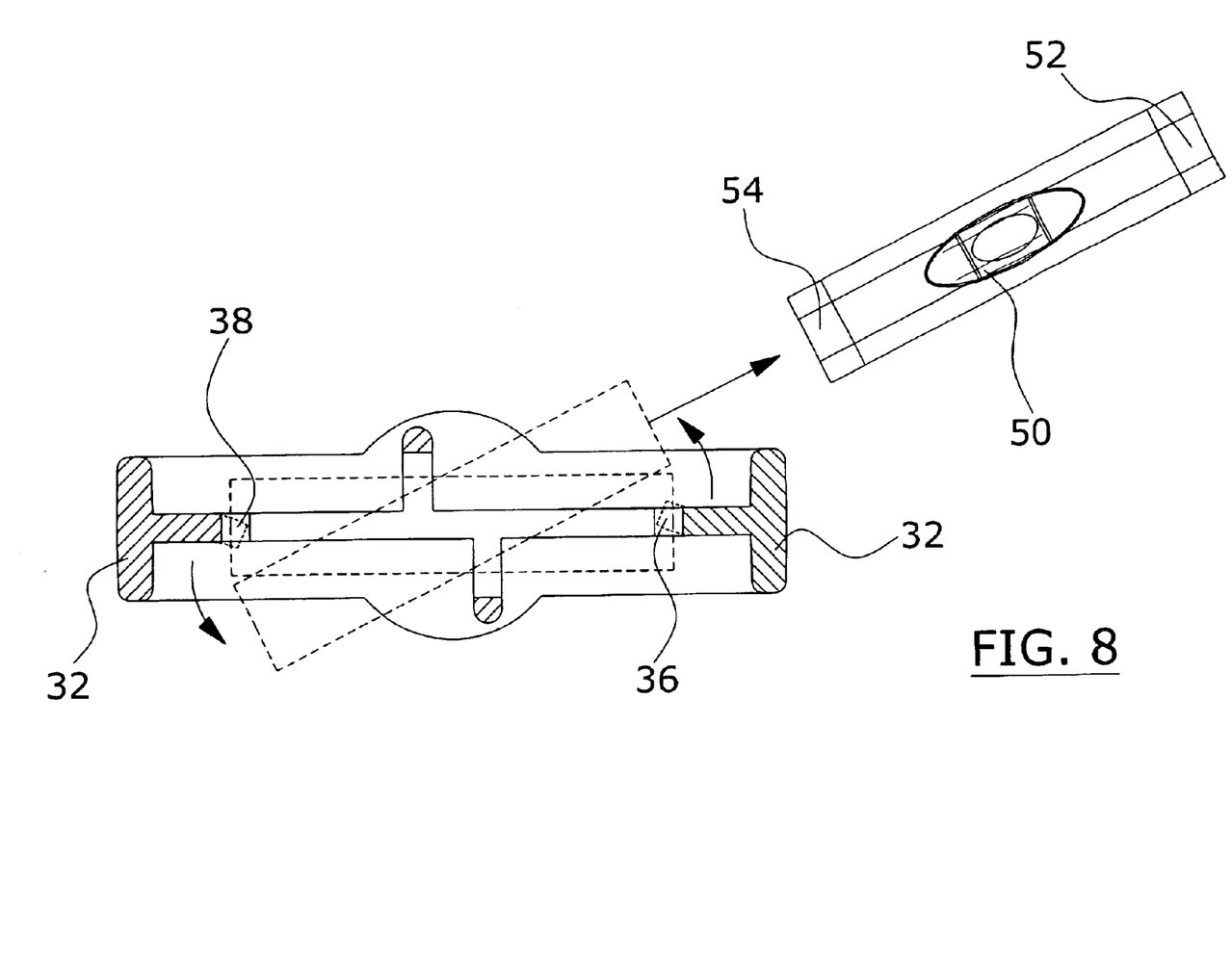
FIG. 8 is a cross sectional view taken along line 8—8 of FIG. 7 illustrating the line level being rotated then removed from the second shoulder structure of the fourth embodiment.

In a second embodiment of the present invention illustrated in FIGS. 7 and 8 of the drawings, the second body 32 within the second shoulder 30 has an open structure with a first member 36 and a second member 38 extending inwardly from opposing sides of the second body 32.

The first member 36 and the second member 38 catchably receive the hooks 52, 54 respectively in a manner substantially traverse to the shank 34 as best illustrated in FIG. 7 of the drawings. To remove the line level 50 from the second shoulder 30, the user simply rotates the line level 50 from within the second shoulder 30 and then removes the line level 50 as shown in FIG. 8 of the drawings. It can be appreciated that the alternative embodiment may also be applied within the first shoulder 20 similar to the second shoulder 30.

F. Operation of Main Embodiment

Figure 5A:
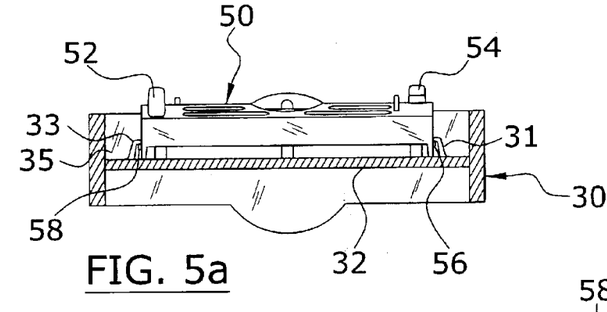
FIG. 5a is a magnified cross sectional view of the line level secured within the receiver cavity of the shoulder.
Figure 5B:
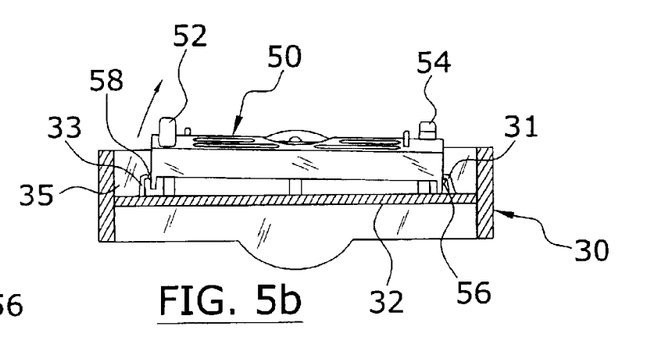
FIG. 5b is a magnified cross sectional view of the line level partially removed from within the receiver cavity of the shoulder.
Figure 5C:
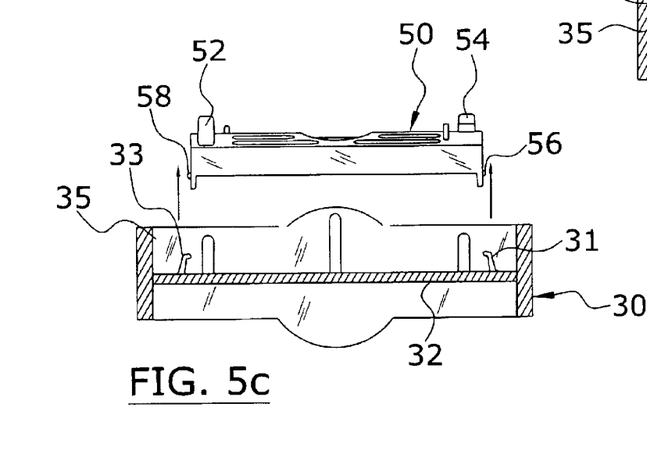
FIG. 5c is a magnified cross sectional view of the line level removed from within the receiver cavity of the shoulder.

When the user desires usage of the line level 50, the user simply grasps or pries the line level 50 from the receiver cavity 35 as shown in FIG. 5b of the drawings. The user may lift one end or both ends of the line level 50 wherein the applied force allows the nubs 56, 58 to be disengaged from the catch members 31, 33 as best shown in FIG. 5b of the drawings. Once the line level 50 is freed from the receiver cavity 35, the user is then able to utilize the line level 50 as desired.

Figure 4A:
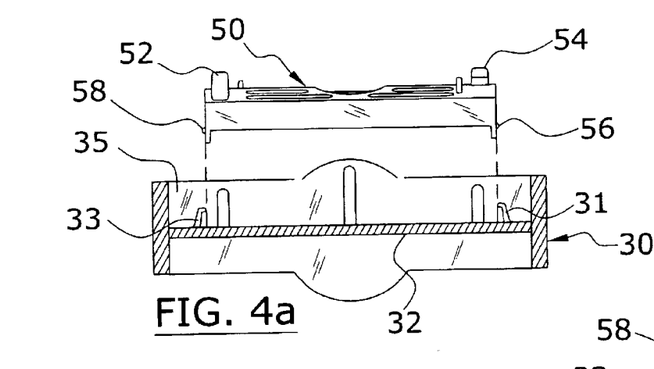
FIG. 4a is a cross sectional view of the line level above the receiver cavity of the shoulder.
Figure 4B:
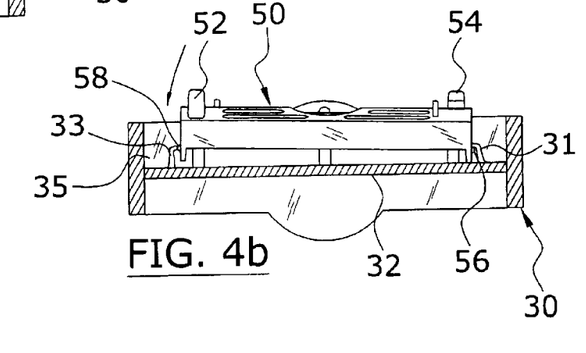
FIG. 4b is a cross sectional view of the line level partially within the receiver cavity of the shoulder.
Figure 4C:
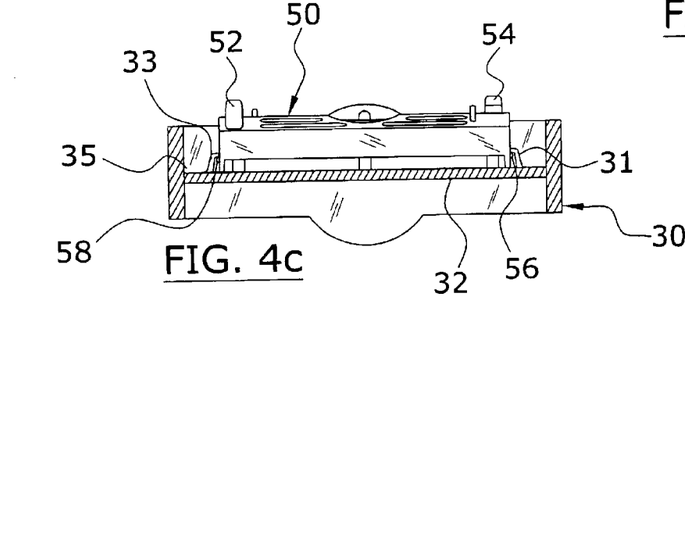
FIG. 4c is a cross sectional view of the line level fully secured within the receiver cavity of the shoulder.

When finished utilizing the line level 50, the user then inserts the line level 50 back into the receiver cavity 35 as shown in FIGS. 4a and 4b of the drawings. The user may insert one of the distal ends of the line level 50 first or both ends simultaneously. The nubs 56, 58 of the line level 50 force the resilient catch members 31, 33 outwardly until the nubs 56, 58 are fully received within the catch members 31, 33. The user is then able to utilize the material dispenser as desired without interference from the line level 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A material dispensing apparatus for dispensing for dispensing and storing elongate material and for storing a line level, comprising:

a frame having a shoulder and a shank extending from said shoulder substantially transversely, wherein said shank is capable of receiving a spool of elongated material; and a receiver cavity within said shoulder for catchably receiving said line level;

wherein said receiver cavity includes a plurality of catch members for catchably retaining said line level within said receiver cavity;

wherein said catch members each have a hooked structure;

wherein said catch members are positioned to engage the opposing distal ends of said line level;

wherein said line includes a first nub and second nub with opposing ends thereof that are catchably received by said catch member;

wherein said nubs are comprised of a transversely straight structure with respect to said line level.

2. The material dispensing apparatus of claim 1, wherein said receiver cavity frictionally receives said line level.

3. The material dispensing apparatus of claim 1, wherein said catch members are comprised of a resilient structure.

4. A material dispensing apparatus for dispensing and storing elongate material and for storing a line level having a first hook and a second hook, comprising:

a frame having a shoulder;

a receiver opening within said shoulder for receiving said line level; and a first member and a second member extending inwardly from said shoulder into said receiver opening for catchably receiving said first hook and said second hook respectively.

5. The material dispensing apparatus of claim 4, wherein said first member and said second member are each comprised of a shaft structure.

6. The material dispensing apparatus of claim 5, wherein said first member and said second member have a common longitudinal axis.

7. The material dispensing apparatus of claim 4, wherein said first member and said second member have a common longitudinal axis.

8. The material dispensing apparatus of claim 4, wherein said first member and said second member are parallel to one another.

9. A material dispensing apparatus for dispensing and storing elongate material and for storing a line level having a first hook and a second hook, comprising:

a frame having a shoulder;

a receiver opening within said shoulder for receiving said line level; and a first member and a second member extending inwardly from said shoulder into said receiver opening for catchably receiving said first hook and said second hook respectively;

wherein said first member and said second member are each comprised of a shaft structure having a common longitudinal axis.

* * * * *